Figure 1:
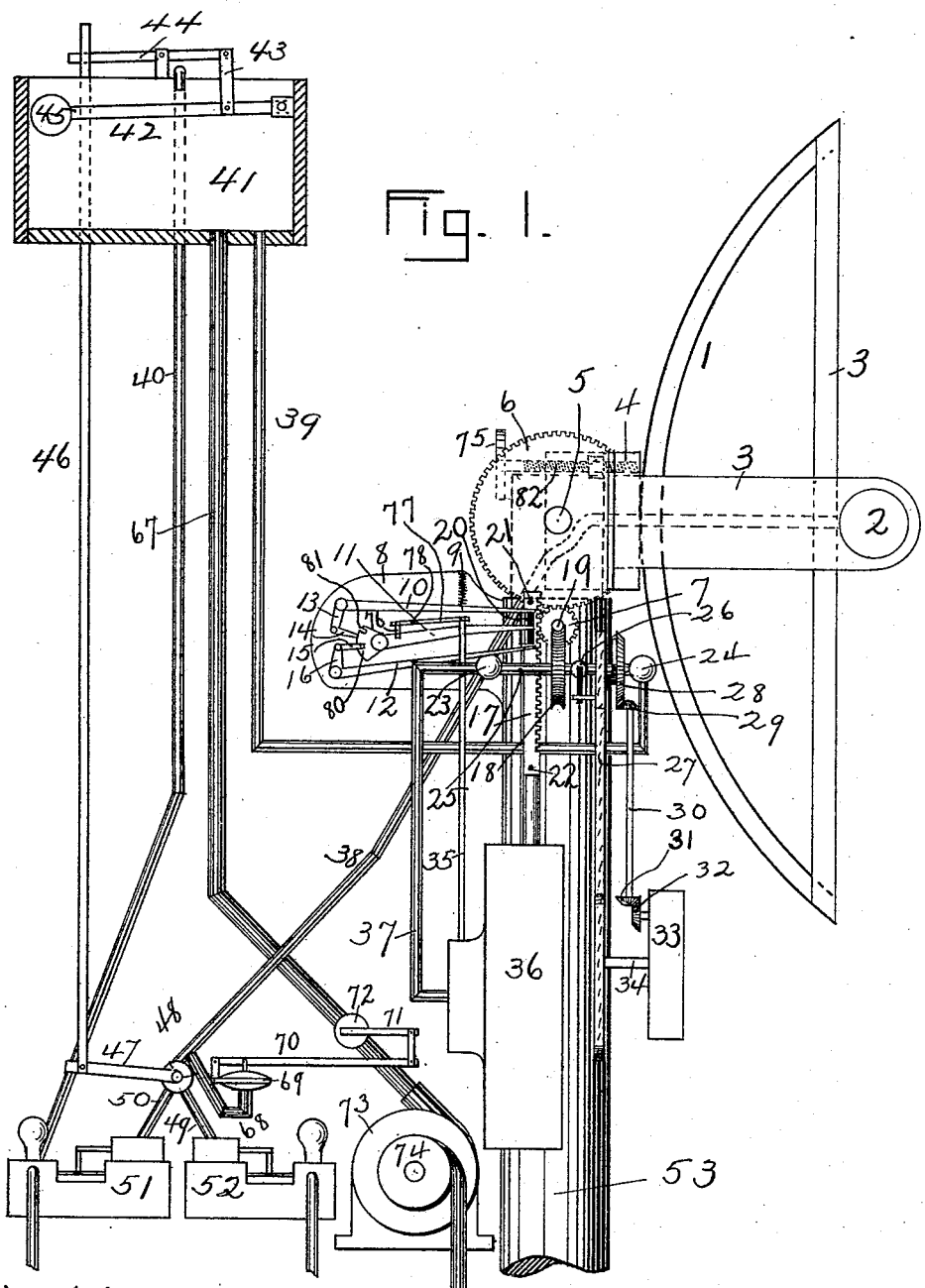

(No Model.) 5 Sheets—Sheet 1.

M. L. SEVERY.
APPARATUS FOR OBTAINING CONTINUOUS POWER FROM THE SUN.

No. 495,163. Patented Apr. 11, 1893.

Witnesses.
D. W. Allen.
A. L. Carpenter

Inventor.
Melvin L. Severy.
by Howe & Kellogg
attys.

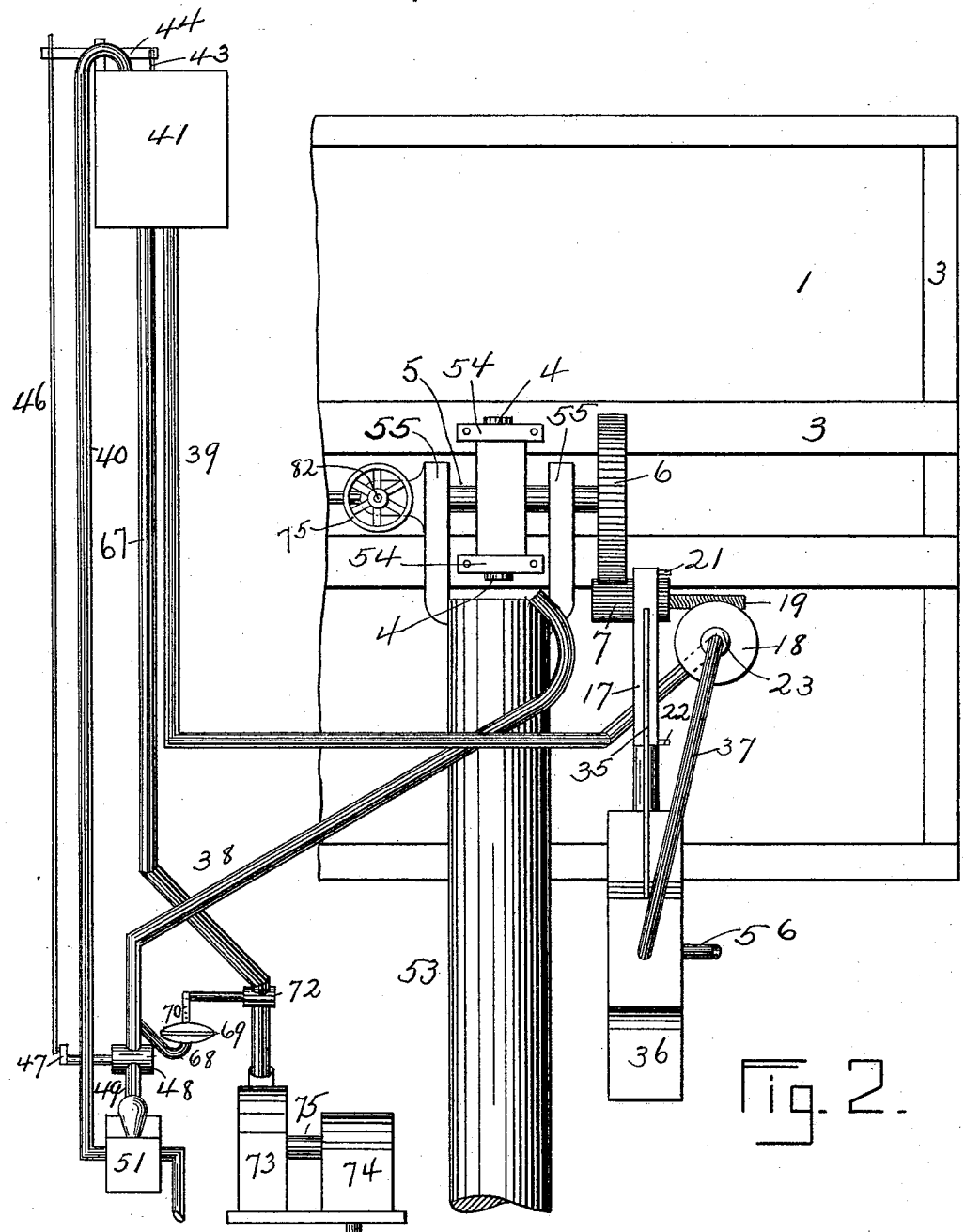

(No Model.) 5 Sheets—Sheet 3.
M. L. SEVERY.
APPARATUS FOR OBTAINING CONTINUOUS POWER FROM THE SUN.
No. 495,163. Patented Apr. 11, 1893.
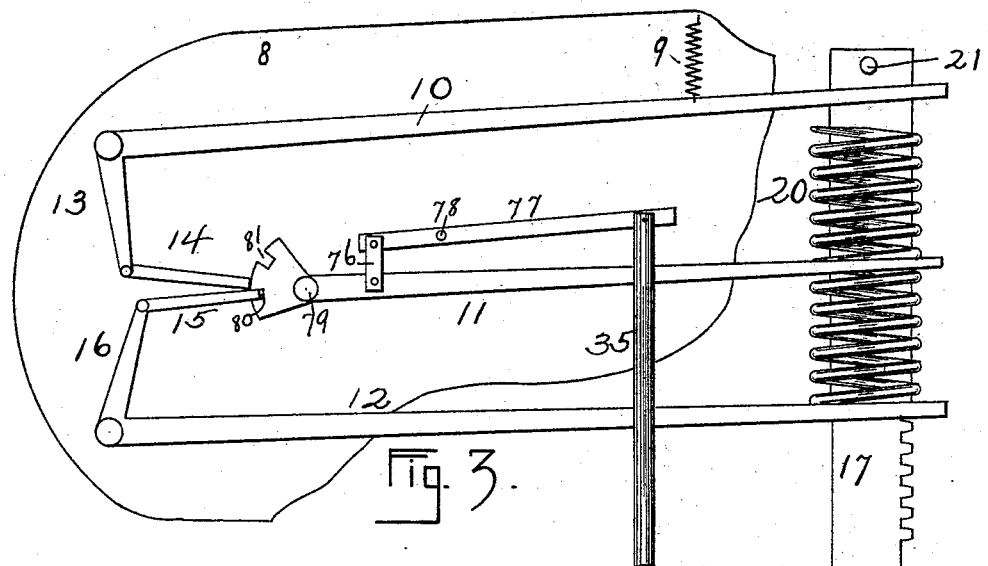
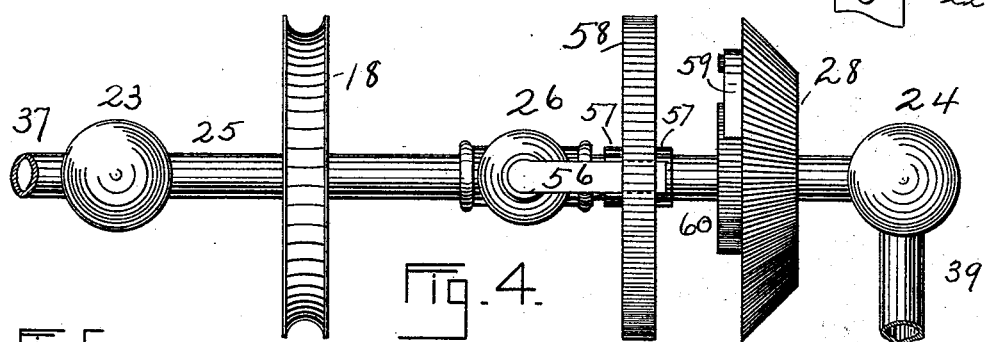
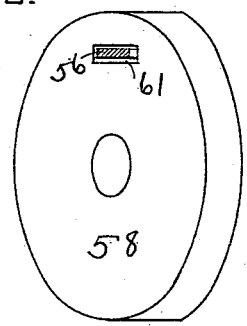
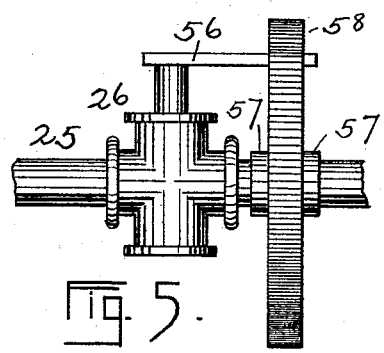
Witnesses.
D. W. Allen.
A. L. Carpenter.
Inventor.
Melvin L. Severy.
by Howe & Kellogg.
attys.

(No Model.) 5 Sheets—Sheet 4.
M. L. SEVERY.
APPARATUS FOR OBTAINING CONTINUOUS POWER FROM THE SUN.
No. 495,163. Patented Apr. 11, 1893.

Witnesses.
D. W. Allen.
A. L. Carpenter.

Inventor.
Melvin L. Severy.
by Howe & Kellogg,
attys.

(No Model.) 5 Sheets—Sheet 5.

M. L. SEVERY.
APPARATUS FOR OBTAINING CONTINUOUS POWER FROM THE SUN.

No. 495,163. Patented Apr. 11, 1893.

UNITED STATES PATENT OFFICE.

MELVIN L. SEVERY, OF BOSTON, MASSACHUSETTS, ASSIGNOR TO FRANCIS DOANE, CHARLES F. CROWELL, AND MELVIN L. SEVERY, TRUSTEES, OF SAME PLACE.

APPARATUS FOR OBTAINING CONTINUOUS POWER FROM THE SUN.

SPECIFICATION forming part of Letters Patent No. 495,163, dated April 11, 1893.

Application filed November 25, 1892. Serial No. 453,093. (No model.)

*To all whom it may concern:*

Be it known that I, MELVIN L. SEVERY, a citizen of the United States, residing at Boston, in the county of Suffolk and State of Massachusetts, have invented certain new and useful Improvements in Apparatus for Obtaining Continuous Power from the Sun, of which the following, taken in connection with the accompanying drawings, is a specification.

The main object of my invention is to produce an apparatus whereby a continuously and automatically acting power may be obtained from the sun.

A further and among other important objects of the invention is to utilize the power derived from the sun automatically to move the parts of the apparatus during interruption of the solar energy, all of which will be herein fully set forth and particularly defined in the claims. Owing to the variations in the diathermal condition of the atmosphere, the power which can be obtained from the heat of the sun is variable, and therefore this power cannot be depended upon for giving the necessary continuous movement to machinery, but if this power can be stored and be automatically set in action on interruption of the solar energy, a source of power will be available for the continuous operation of mechanical devices at all times, independent of the power directly obtained from the heat receiver.

My invention is embodied, first, in the combination, substantially as and for the purpose hereinafter more fully set forth, of a heat receiver suitably supported in the focus of a device for concentrating the rays of the sun; means for supporting this concentrating device so that it is capable of movement in accordance with the apparent movement of the sun; a motor, operated by the power obtained from the heat receiver; means whereby this motor is caused to store up power; and means for utilizing this stored power to effect the movement of mechanism moving the concentrating device in accordance with the apparent movement of the sun and for other purposes, whereby a continuous power is obtained independent of variations in the power directly obtained from the heat receiver. Second, in the combination, substantially as and for the purpose hereinafter more fully set forth, with mechanism moving the concentrating device in accordance with the apparent diurnal movement of the sun, of a motor operating the same, and mechanism operating automatically on the completion of the movement of the concentrating device in one direction to cause the motor to reverse its movement, and thus cause the concentrating device to complete a return movement in the other direction. Third, in the combination, substantially as and for the purpose hereinafter more fully set forth, with the motor effecting the movement of the reflector, of a train of clock-work and mechanism operated thereby acting to correct any acceleration or retardation in the movement of the motor, by causing a diminution or increment in the power operating the same; and, fourth, in the combination, substantially as and for the purpose hereinafter more fully set forth, with the motor and train of clock-work, of mechanism acting to effect the winding up of the clock-work during the nocturnal movement of the motor.

In the accompanying drawings is shown an apparatus constructed upon the principles of my invention, the stored power consisting, in this case, of water pumped into a reservoir by means of a steam pump operated by steam from the boiler in the focus of the concentrating device, but I can use any other stored power, as for example, electricity stored in a storage battery and obtained from a dynamo operated by a steam engine supplied with steam from the boiler. I have also shown that when it is not necessary to operate the steam pump for the purpose of supplping water to the reservoir, the steam from the boiler is automatically diverted to another steam pump, and when the supply of steam from the boiler is interrupted, the water in the reservoir is automatically supplied to operate still another pump, so that a continuous pumping, or any other movement can be obtained independent of variations or interruptions in the power directly obtained from the heat of the sun.

Figure 7:
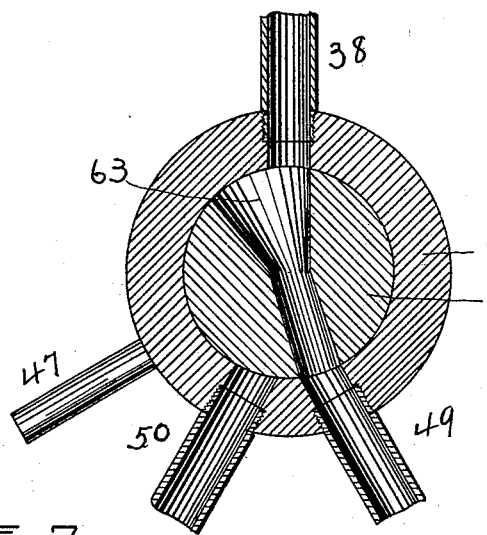
Figure 8:
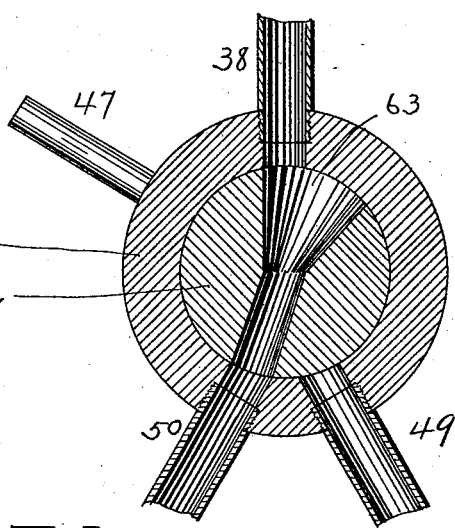
Figure 9:
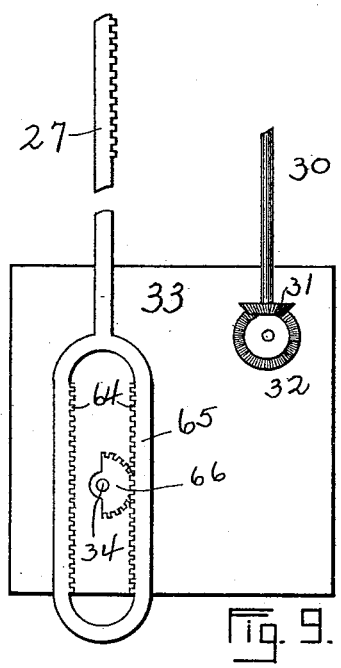
Figure 10:
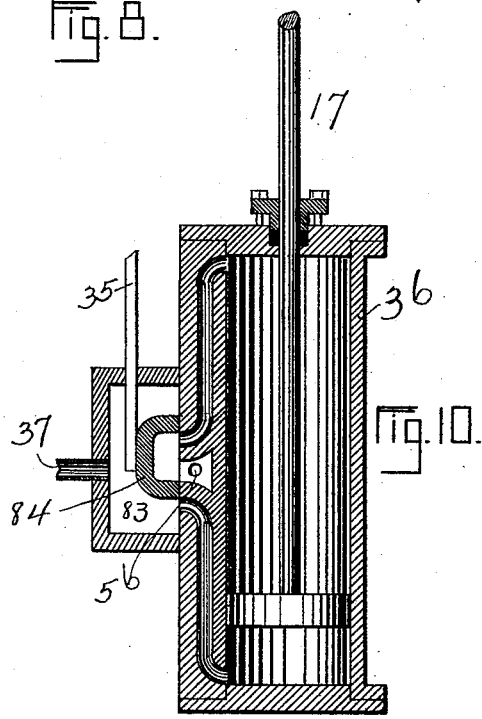
Figure 11:
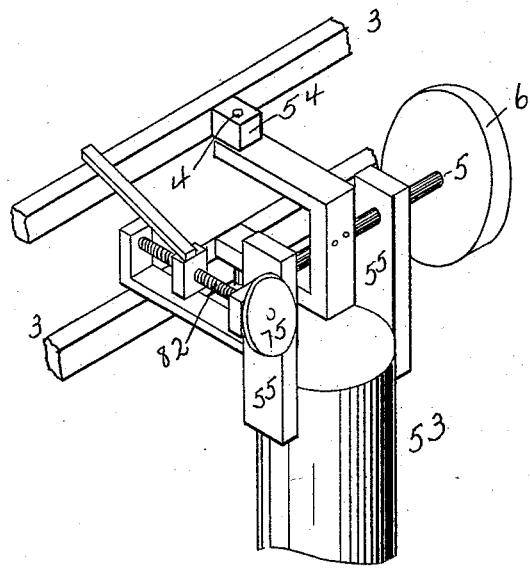

Referring to the drawings, Figure 1 is a view of the apparatus in elevation. Fig. 2 is a rear view of the same. Fig. 3 is a view of the mechanism effecting the movement of the slide valve. Fig. 4 is a plan view of the valve which regulates the supply of water to the water motor and of part of the pipe carrying this water. Fig. 5 is a view in elevation of this valve. Fig. 6 is a view in perspective of part of this valve mechanism. Fig. 7 is a sectional view of the valve which controls the supply of steam to the pumps. Fig. 8 is another sectional view of the same. Fig. 9 is a view of part of the mechanism operated by the train of clock work. Fig. 10 is a longitudinal sectional view of the water motor. Fig. 11 is an isometrical view of the device supporting the reflector, and Fig. 12 is a side view of the same.

In these several figures the same numerals refer to the same parts.

Referring to the drawings, 1 is a curved reflector for concentrating the rays of the sun, and 2 is a longitudinal steam boiler supported in the focus of this reflector, and moving with it. This reflector is attached to a horizontal trunnion 5, mounted upon the supports 55, attached to the standard 53, and is therefore capable of movement in a vertical plane. It is also pivoted upon a vertical rod 4, attached to a suitable frame, and is thus rendered capable of movement in a horizontal plane. The combination of these movements secure the parallelism of the axis of the reflector with the rays of the sun at all times during the day, at all places and at all seasons of the year, that is to say, a proper movement of the reflector in accordance with the apparent diurnal and annual movement of the sun.

Figure 12:
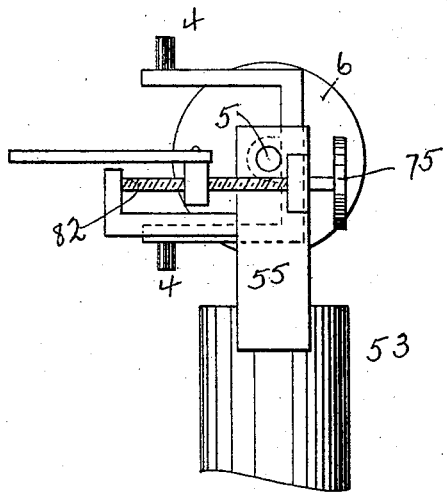

The horizontal movement of the reflector can be effected by hand by means of the hand wheel 75 on the shaft 82, which shaft has a screw thread thereon and passes through a nut connected to the reflector as shown in Figs. 11 and 12, but the other movement of the reflector is effected by mechanism operated by any suitable power.

In an application for Letters Patent of the United States filed by me November 10, 1892, Serial No. 451,554, I have described and claimed means for supporting the reflector constructed on the same principle and for the same purpose as the means herein described. I therefore do not claim this means in this application.

A convenient source of power for the purpose of operating the mechanism for moving the reflector in accordance with the apparent diurnal movement of the sun, is that derived from the flow of water stored in a suitable tank, and acting upon a suitable water motor at a lower level than the tank, and in the apparatus described in this application this source of power is used. 36 is a water motor, shown more fully in Fig. 10. It consists of a suitable cylinder in which reciprocates a suitable piston 17. The water passes by a pipe 37 into a chamber 83, on the side of the cylinder, and from this chamber the water is admitted alternately to opposite sides of the piston through suitable ports communicating with the cylinder at the top and bottom of the same, respectively. In the cylinder is a slide valve, 84, of the ordinary construction, having a reciprocating motion, and acting to alternately open and close the ports, and to establish communication between the discharge pipe and either side of the piston. This slide valve is operated by mechanism which will be hereinafter more fully described, so that when the piston has completed its upward stroke, the port which admits water below the piston will be closed, and that which admits water above the piston will be opened, and when the piston has completed its downward stroke, the port admitting water above the piston will be closed, and that admitting water below the piston will be opened. The water escapes from the motor by the pipe 56, and the entrance to this pipe is covered by the slide valve, and is put into communication with either side of the piston according to the position of the valve. Upon the piston is a vertical rack-bar 17, which engages with a pinion 7 on the shaft 19, and this pinion 7, engages with a toothed wheel 6, fixed on the trunnion 5, and thus the vertical movement of the piston is made to give to the reflector the movement necessary to maintain it constantly opposite to the sun in accordance with the sun's apparent diurnal movement. The movement of the reflector during the day time is effected by a single upward movement of the piston, while the reverse movement of the reflector during the night in order to bring it back from its position facing the west on the setting of the sun, to a position facing the east so as to be opposite the rising sun, is effected by a single downward stroke of the piston. The change in the direction of movement of the piston is effected by the movement of the slide valve, and this valve is automatically operated on the completion of each stroke of the piston by the mechanism now to be described, and shown in Fig. 1, and in an enlarged view in Fig. 3. It is necessary that the movement of the slide valve should take place abruptly, and when started, its movement must be fully completed, as in all slide valves. The mechanism effecting this movement is constructed so as to accomplish this result. The vertical rod 35, attached to the slide valve, is connected to an arm of a horizontal lever 77, pivoted at 78 on the plate 8, and the other arm of this lever is connected by a link 76, to a lever 11, which is pivoted at 79 to the plate 8, and extends across the face of the bar 17, and is securely fastened to the center of a vertical helical spring 20. Attached to the lever 11, is a quadrant-shaped plate having two notches, 80 and 81, on its periphery. Above and below the lever 11 are two bell crank levers, and the longer arms 10 and 12, of each of these levers are nearly parallel to the lever 11, and extend respectively across the face of the bar 17, above and below the spring 20. To the shorter arms, 13 and 16, of these bell crank levers, are pivoted respectively arms 14 and 15, which extend to the quadrant-shaped plate, and one or the other of the arms enters a notch on the quadrant, and one or the other bears against the periphery of the quadrant, according to the position of the levers 10 and 12; the engagement of the arm in a notch preventing the movement of the lever 11, and the consequent movement of the slide valve, which, as before stated, is connected to the lever by the rod 35, lever 77 and link 76. Upon the face of the bar 17 are two pins or stops, 21 and 22, at such a distance from one another that when the piston has completed its upward stroke, the lower pin, 22, will bear against the arm 12, and compress the spring 20, and when the piston has completed its downward stroke, the upper pin, 21, will bear against the arm 10, and again compress the spring 20. When the pin 22 bears against the arm 12, the arm is moved upward, so that, by the corresponding outward movement of the arm 16, the arm 15 is drawn out of the notch 80, in the quadrant-shaped plate. The lever 11 is now free to move, so that, acted upon by the compressed spring, it springs suddenly upward, and causes the connected rod 35 to move downward, carrying with it the slide valve, with the effect that the lower induction port is put into communication with the induction port 56, and the upper induction port is put into communication with the chamber 83 and the supply pipe. The water, therefore, now escapes from below the piston, and at the same time water flows into the space above the piston, causing the downward movement of the same. When the lever 11 moves, the quadrant-shaped piece attached thereto also moves until arrested by the engagement of the end of the arm 14 in the notch 81, this arm being forced into the notch by the action of the spring 9, tending to draw up the arm 10. When, on the completion of the downward stroke of the piston, the stop 21 bears against the arm 10, this arm is forced down, the arm 14 is withdrawn from the notch, and by the action of the spring 20, the lever 11 is forced down, until arrested by the engagement of the arm 15 in the notch 80, and the slide valve is drawn up, thus permitting the escape of water from above the piston, and admitting water below the piston.

The mechanism which has been described, is presented as a convenient device for accomplishing the desired result, but instead of this device, I can use any other which will automatically effect the reversal of the movement of the motor on the completion of its movement in either direction.

The water which operates the water motor is obtained from a tank 41, placed sufficiently above the water motor to afford a head of water to operate the motor, and this tank is filled from any suitable source by means of a pump operated by the steam generated in the boiler by the heat of the sun. The water flows into the water motor from the tank 41, by means of the pipes 39 and 37, and the horizontal pipe 25, connecting these pipes, and extending across the face of the reciprocating rod, 17.

It is necessary, in order that the reflector may always be maintained opposite the sun, that this reflector should have a uniform rate of movement, and therefore, that means be provided for correcting any acceleration or retardation in said movement. A convenient mechanism which I use for this purpose will now be described. 33 is a train of clockwork attached to the standard 53. On the main arbor, 34, of this train, is a semi-circular toothed wheel, 66, situated between two connected rack bars, 64 and 65, having teeth opposite to one another. The teeth of the wheel 66, on its rotation engage alternately with the teeth of the bars 64 and 65, thus producing a reciprocating movement in the bar 27, to which the rack bars 64 and 65 are attached. The horizontal portion, 25, of the water pipe is connected respectively to the pipes 37 and 39 by ball joints 23 and 24, so that it is capable of rotation without escape of the water, and in this pipe is a valve, 26, by means of which the flow of water through the pipe and to the motor is regulated. On the pipe or shaft 25, and turning with the same, is a worm wheel, 18, in which a worm on the shaft 19 engages. The pipe 25 is thus caused to rotate in accordance with the movement of the reciprocating rack bar 17. Loosely mounted upon the pipe 25, by means of the collars 57, 57, is a toothed wheel, 58, and this toothed wheel is rotated by the action upon it of the rack bar 27. In the side of the wheel 58 is a slot, 61, through which passes an arm, 56, attached to the stop-cock 26, said arm being narrower than the slot. The wheel 58, being driven by the clock-work, rotates at a uniform rate, but the rate of rotation of the shaft 25, is liable to acceleration or retardation. As long, however, as the shaft 25 and the wheel 58 rotate at the same rate, the arm 56 will not touch the sides of the slot, but any difference of rates between the two, will cause the arm 56 to strike one side or the other of the slot, thus opening or closing the valve 26, and increasing or diminishing the amount of water admitted to the motor, thus accelerating or retarding the rate of movement of the piston and rack bar, until the shaft 25 rotates at the same rate as the wheel 58. Instead of an arm 56 and slot 61, any other device which will accomplish the same result may be used.

I propose to effect the winding of the train of clock-work automatically, and to this end there is, upon the pipe 25, a ratchet wheel, 60, keyed to the pipe, and a bevel wheel 28, loose upon the pipe. These two wheels are connected together by a pawl, 59. The bevel wheel 28, is geared to the winding arbor of the train of clock-work by means of the bevel wheels 29, 31 and 32, and the shaft 30. During the rotation of the pipe 25 in the daytime, the pawl 59 slips over the teeth of the ratchet wheel 60, but when the pipe rotates in the other direction during the night, as before explained, the pawl 59 engages with the teeth of the ratchet wheel, and the bevel wheel 28 moves with the pipe 25, thus winding up the clock-work.

As before stated, the tank 41 is filled by means of a steam pump operated by the steam generated in the boiler 2. 51 is this steam pump, which is supplied with steam through the pipes 38 and 50. Only a part of the steam generated in the boiler is required to operate this steam pump, and the remainder of the steam can be used for operating any other motor, as, for example, another steam pump, 52. In order that this pump 52, may be supplied with steam, except at such times as it is necessary to operate the steam pump 52, in order to maintain the proper amount of water in the tank, a valve is located in the pipe 38, which is automatically operated through suitable levers and rods, 42, 43, 44 and 46, by the action of a suitable float, 45, in the tank. This valve is shown in detail in Figs. 7 and 8. It consists of a cylinder 62, capable of partial rotation in a concentric cylinder 61, and traversed by a way, 63, which is partially funnel shaped. To the axis of the cylinder 62, is attached the arm 47, which, as before stated, is connected by suitable levers and rods to the float 45. Passing through the cylinder 61, are the pipes 38, 49 and 50. As long as the level of the water in the tank remains above a certain point, the steam from the boiler passes from the pipe 38, through the way 63, to the pipe 49, and thence to the steam pump 52, but when the level of the water in the tank falls below a certain point, the corresponding movement of the float 45, acting through the levers 43 and 44, and the rod 46 and arm 47, turns the cylinder 62, so that the pipe 49 is closed, and the steam passes from the pipe 38 to the steam pump 51, through the way 63 and pipe 50. The steam pump 51 now operates, and water is supplied to the tank until the float moves sufficiently to again operate the valve, so that the steam will pass to the pump 52. In order to prevent the valve 48 from acting under a slight movement of the float, the lever 44 moves freely in a slot in the rod 46, the slot being of such length that the float will not move the valve to start the pump 51 until the tank is nearly empty, nor will it stop the supply of water to the tank until it is full.

Instead of two pumps, I can use one pump only, and can provide an arrangement of pipes in connection with a valve operated by the movement of a float on the water in the tank, so that when the water in the tank has reached a predetermined level, the supply of water will be diverted from the tank, and delivered to any other desired place, and when the water in the tank falls below a predetermined level, the supply of water to the tank will be resumed. I consider this pump which has a double function, as equivalent to the two pumps shown, each having an independent function.

Assuming that the steam pump 52 is used for removing water from a mine, and that, in order to prevent the accumulation of water, the pumping must be continuous, it is obvious that a pump operated by steam generated by the sun's heat would not answer the purpose, for the reason that the action of the sun upon the boiler would not be the same at all times, and during some days or parts of days no steam would be generated. The water pumped into the tank when the sun was available as a source of power can now be used to operate another pump or engine, and if automatic mechanism is provided for causing this pump to act whenever the steam pump ceases to operate, the pumping from the mine will be continuous, notwithstanding variations in the power obtained from the steam boiler. I have shown in Fig. 1, a device of this description. In this figure, 74 is a rotary pump connected to a turbine wheel 73, which is operated by water supplied from the tank 41 through the pipe 67. In this pipe is a valve 72. Connected with the steam pipe 38 is a branch pipe, 68, and on this pipe is a pressure valve, 69, which acts through suitable connections, 70, 71, to keep the valve 72 closed as long as the pressure of steam is maintained. When the pressure falls below that required to operate the pumps, this valve automatically opens, and water flows through the pipe 67, thus operating the wheel 73 and the pump 74.

The method of storing power derived from the heat of the sun, which method consists in filling a reservoir with water by the action of a steam pump operated by steam generated by the sun's heat; the utilization of the energy obtained by the flow of this water from a higher to a lower level, for operating the mechanism moving the reflector and for other purposes, and the operation of pumps by means of the steam generated in the boiler by the sun's heat, have been shown combined together in the apparatus which is herein described, for the purpose of showing an embodiment of my invention in practice, for the reason that these devices admit of being easily represented in a drawing, but the practical embodiment of my invention is by no means limited to the use of these devices.

As before stated, I can use any other forms of stored energy, as for example, the steam from the boiler could be used to operate a dynamo, and this dynamo could supply electricity to charge a storage battery, and the electricity from this storage battery could operate a motor which would actuate the mechanism moving the reflector. A switch, acting automatically, could be provided which, when the storage battery was fully charged, would cause the steam from the boiler to be diverted to a sceond engine, and when the supply of steam became inadequate to operate the engine, a suitable switch, acting automatically, would shunt the electricity in the storage battery to a motor, thus maintaining a continuous power, independent of variations in the power directly obtained by the action of the sun's heat upon the heat receiver. The automatic valves and stop cocks described and shown in this application, would then find their equivalents in automatic switches.

As the construction of dynamos, storage batteries and the necessary automatic switches are well known and can be easily made by the skilled electrician, the foregoing description is sufficient to illustrate how the principle of my invention can be carried into effect with other forms of stored power.

Having thus described my invention, what I claim, and desire to secure by Letters Patent of the United States, is—

1. In an apparatus for utilizing solar energy, means for obtaining mechanical power from the sun, means for storing mechanical power from the sun, and means for automatically setting in action the accumulated power on interruption of the solar energy, as set forth.

2. In an apparatus for utilizing solar energy, means for obtaining mechanical power from the sun, means for storing mechanical power from the sun, means for automatically setting in action the accumulated power on interruption of the solar energy, and means for automatically cutting-off or reserving the said stored power on recurrence of the solar energy, as set forth.

3. In an apparatus for utilizing solar energy, means for obtaining mechanical power from the sun, a device operated by the power obtained by said means, means for storing mechanical power from the sun, means connecting said storing devices with the second-mentioned means, and means for automatically setting in action the accumulating device to operate the said second-mentioned means on interruption of the solar energy, substantially as set forth.

4. In an apparatus for utilizing solar energy, means for obtaining mechanical power from the sun, means operated by the power obtained by said means, means for storing a part of the power obtained by the first-mentioned device, means connecting said storing device with the second-mentioned means, and means for automatically setting in action the said storing device on interruption of the solar energy, substantially as set forth.

5. In an apparatus for utilizing solar energy, means for obtaining mechanical power from the sun, a device operated by the power obtained by said means, means for storing a part of the power obtained by the first-mentioned means, means connecting said storing device with the second-mentioned means, means for automatically setting in action the said storing device on interruption of the solar energy, and means for automatically cutting-off or reserving the action of the storing device on recurrence of the solar energy, substantially as set forth.

6. In an apparatus for utilizing solar energy, the combination of a heat receiver, a device for concentrating the rays upon said receiver, means for automatically imparting a movement to the concentrator co-incident with the diurnal path of the sun, means for storing power from the sun, means connecting said storing devices with the concentrator, and means for automatically setting in action the said storing devices to move the concentrator on interruption of the rays, substantially as set forth.

7. In a device for the utilization of the sun's heat for the production of power, the combination substantially as and for the purpose set forth, of a device for concentrating the rays of the sun and movable in accordance with the diurnal movement of the sun; a heat receiver placed in the focus of said concentrating device and movable with said device; mechanism for moving said concentrating device in accordance with the apparent movement of the sun whereby the axis of said concentrating device is constantly maintained parallel to the sun's rays; a motor operated by the power from said heat receiver and converting its work into stored energy; a reservoir for said stored energy; a second motor also operated by the power from the heat receiver, but operating only when the first named motor ceases to operate; a device acting when the stored energy reaches a predetermined potential to stop the first named motor and permit the second named motor to operate, and upon the fall of the potential below a predetermined point to stop the second named motor and cause the first named motor to operate; a motor operated by the stored energy, and mechanism automatically acting to release said energy to actuate said motor whenever the power directly obtained from the heat receiver is inadequate or unavailable, whereby a continuous power is obtained independent of variations in the power directly obtained from the sun.

8. In a device for utilizing the sun's heat for the production of power, the combination substantially as and for the purpose set forth, of a device for concentrating the rays of the sun; a steam boiler located in the focus of the concentrating device and moving with the same; mechanism for moving said concentrating device in accordance with the diurnal movement of the sun; a steam pump 51 operated by steam from the boiler; a reservoir of water filled by said pump; the steam pump 52; the steam pipe 38; the valve 48 in the pipe 38; the pipe 50 connecting the valve to the steam pump 51; the pipe 49 connecting the valve to the pump 52; and mechanism operated by changes in the level of the water in the reservoir to move the valve 48 to divert the steam from one pump to the other according to the height of the water in the reservoir.

In testimony whereof I have hereunto subscribed my name this 23d day of November, A. D. 1892.

MELVIN L. SEVERY.

Witnesses:
D. W. ALLEN,
CHAS. A. KELLOGG.